Figure 1:
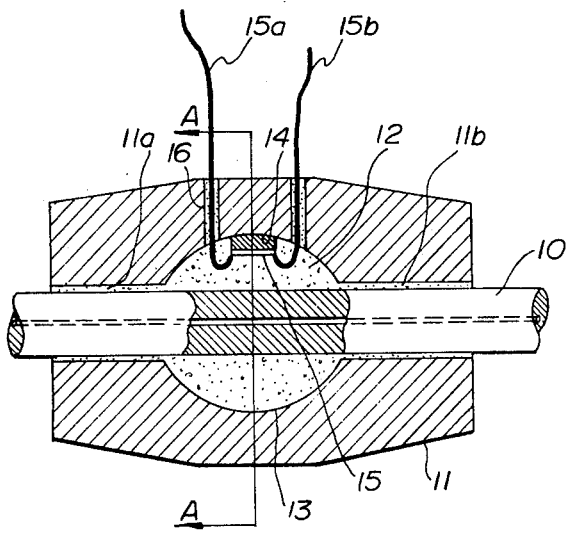

United States Patent [19]

Heggie

[11] 4,027,536
[45] * June 7, 1977

[54] TRANSDUCER FOR ENGINE FUEL INJECTION MONITORING

[75] Inventor: William S. Heggie, Bells Corners, Canada

[73] Assignee: Canadian Patents and Development Limited, Ottawa, Canada

[ * ] Notice: The portion of the term of this patent subsequent to Feb. 10, 1993, has been disclaimed.

[22] Filed: May 21, 1976

[21] Appl. No.: 688,908

Related U.S. Application Data

[63] Continuation-in-part of Ser. No. 624,114, Oct. 20, 1975, abandoned.

[52] U.S. Cl. .......................... 73/398 AR; 73/119 A
[51] Int. Cl.² .......................................... G01L 9/04
[58] Field of Search .......... 73/113, 398 AR, 119 A; 338/4, 36

[56] References Cited

UNITED STATES PATENTS

| | | | |
|---|---|---|---|
| 2,420,148 | 5/1947 | Ostergren | 73/398 AR |
| 2,544,567 | 3/1951 | Rundell | 73/398 AR |
| 2,747,408 | 5/1956 | Boytim et al. | 73/398 AR |
| 2,981,911 | 4/1961 | Warnick | 338/4 |
| 3,196,375 | 7/1965 | Jones | 338/36 |
| 3,937,087 | 2/1976 | Heggie | 73/398 AR |

*Primary Examiner*—James J. Gill
*Assistant Examiner*—Anthony V. Ciarlante
*Attorney, Agent, or Firm*—James R. Hughes

[57] ABSTRACT

A transducer for diesel fuel injection monitoring comprising a barrel-shaped housing made of strong metal encompassing the fuel line tube and fixedly attached to the tube circumferentially at outer positions and defining an enclosed annular volume, a pressure measuring element positioned in the said volume away from the fuel tube and adjacent the inner wall of the housing, and a solid cold flowing material completely filling the volume between the fuel tube and the housing with the pressure measuring embedded therein. In a preferred version of the transducer is split to enable easy installation.

8 Claims, 5 Drawing Figures

TRANSDUCER FOR ENGINE FUEL INJECTION MONITORING

This application is a continuation-in-part application Ser. No. 624,114, filed Oct. 20, 1975 now abandoned by the same applicant.

This invention relates to a transducer for diesel fuel injection monitoring and more particularly to an improved means for mounting a pressure measuring transducer in relation to a thick walled fuel injection line such that high resolution pressure-time histories of the fuel injection cycle may be obtained.

Diesel fuel injection system malfunctions are responsible directly and indirectly for possibly more engine problems than any other single system or device, ranging from poor efficiency to major engine damage. A considerable amount of work has been done on the analysis of diesel injection phenomenon via the pressure-time signature. This has been limited to laboratory conditions and clinical type transportable equipment which undesirably requires breaking into a modifying the system to accomodate transducers which require direct communion with the fluid. The following paper deals with the current state of the art of diagnosis using the fuel injection pressure time history; An Electronic Analyser for Diesel Engines, by R. German et al. SAE, Paper No. 690,474 May 1969.

Systems that require breaking into the fuel line and direct contact with the fuel are not attractive for the following reasons. (a) The extremely precise nature of a diesel fuel injection system and its sensitivity to make it undesirable to use sensing devices directly with the fluid. (b) A good dynamic crystal transducer installation which is at present commercially available is very expensive with the cost being too prohibitive to apply to an engine on a full time, all cylinder basis (c) The life of present types of transducers is less than acceptable.

In U.S. patent application Ser. No: 486,189 filed July 5, 1974 by the present applicant and entitled Transducer for Engine Fuel Injection Monitoring, a transducer for obtaining pressure-time histories of fuel injection systems is described. This device was formed of at least one resistance element strain gauge fixedly mounted longitudinally around the circumference of a fuel line tube such that expansion and contraction of the tube cause variations of the resistance of the resistance element, a plastic sleeve covering the resistance element at least in some part, a torpedo-shaped housing made of strong metal encompassing the tube and the resistance element mounted thereon and fixedly attached to the tube circumferentially at outer positions away from the resistance element, the housing defining an annular space between the housing and the tube, a strong setting adhesive filling the space, and electrical leads from the resistance element to the exterior through openings in the housing. It was found to work well in practice if care was taken in mounting but it requires the resistance element to be cemented directly and intimately to the fuel injection line requiring the presence of skilled and trained persons in the field. This presents a disadvantage.

This and other objects of the invention are achieved by a transducer comprising a barrel-shaped housing made of strong metal encompassing the fuel line tube and fixedly attached to the tube circumferentially at outer positions and defining an enclosed annular volume, a pressure measuring element positioned in the said volume way from the fuel tube and adjacent the inner wall of the housing, and a solid cold flowing material completely filling the volume between the fuel tube and the housing with the pressure measuring element embedded therein. The pressure measuring element may be either a strain gauge element with a backing layer of yieldable material e.g. rubber associated with it or a pressure-to-electrical transducer e.g. a piezo-electric crystal. In a preferred version the transducer is split to enable easy installation either by gluing or by mechanical clamping means.

Figure 2:
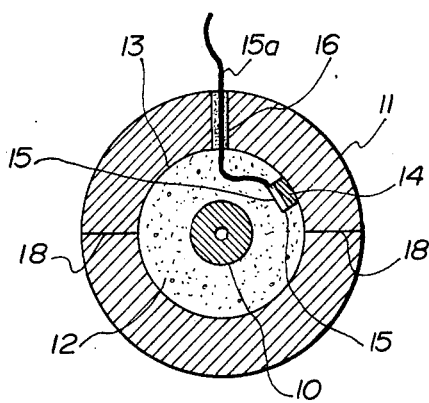
Figure 3:
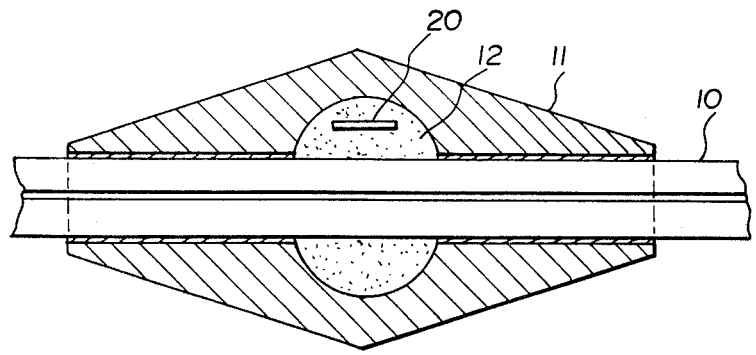
Figure 4:
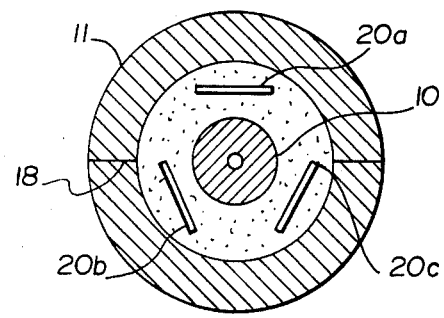
Figure 5:
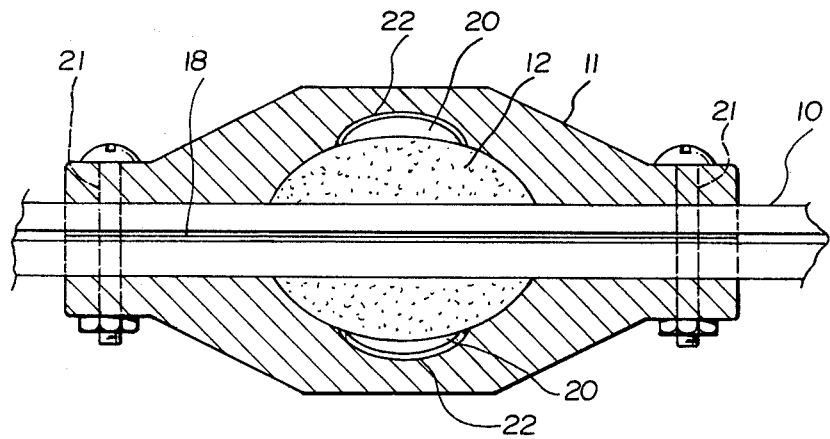

In drawings which illustrate an embodiment of the invention,

FIG. 1 is a longitudinal cross-section of the device with a strain gauge element, FIG. 2 is a transverse cross-section of the device, FIG. 3 is a longitudinal cross-section of the device with a piezo-electric crystal, FIG. 4 is a transverse cross-section of the device with three piezo-electric crystals mounted therein, and FIG. 5 illustrates a typical mechanical clamping device.

Referring to FIG. 1, a thick-walled tube 10 of a fuel injection system is shown with a transducer mounted thereon. The latter is made up of a barrel-shaped housing 11 made of stong metal preferably steel and encircling the tube and firmly and fixedly attached to the tube preferably by epoxy resin adhesive applied in the cylindrical areas 11a and 11b. This method of mounting operates to firmly clamp and immobilize the tube at these positions. The housing defines a relatively large central space or volume (well) 12 having a back wall 13. Mounted on this back wall is a backing layer 14 of compressible substance preferably a rubber material and on this is mounted a transducer 15 which is a pressure-sensitive element. These are conventional devices and readily available commercially. Electrical leads 15a and 15b pass from the element to the exterior via sealed openings 16 in the housing.

The inner volume or well 12 is completely filled with a solid, cold flowing material over the very small expansion and contraction excursions exhibited by the fuel tube, this cold flowing material although solid acts similarly to a hydraulic fluid. It has been found that epoxy resin is a good material for this purpose.

FIG. 2, a cross-section on A—A of FIG. 1, illustrates in a somewhat exaggerated form as the backing layer 14 and the element 15 are actually much smaller than shown the mounting of the same elements. If the device is manufactured in split form as shown by line 18, it gives a device that can be intalled quickly and easily in the field. The two split halves containing the transducer and the backing layer have the well filled and the areas 11a and 11b coated with epoxy resin on the job and are put in position immediately.

It is a feature of this invention that the resistance element transducer is not fixed directly to the tube but is positioned away from it. The cold flowing material (epoxy resin) in the volume 12 transmits the signal (hoop stress expansion of the fuel tube) to the transducer element. The signal is also multiplied as volumetric displacement is acquired or affected by as much as four times the tube surface available for the case (application Ser. No. 486,189) where the transducer is directly attached to the tube. The backing layer allows expansion of the transducer.

The output of the device is taken via the leads to suitable output circuitry (not shown) e.g. a conventional bridge measuring circuit.

FIGS. 3 and 4 shown an alternative arrangement. In this version a piezo-electric crystal transducer 20 is mounted in the inner volume or well 12, actually embedded in the epoxy resin filling this volume. The crystal transducer should be mounted such that pressure is applied to two faces and not evenly around the complete device. Small spaces at the ends of the crystals could be left such that pressure is not applicable at these locations. Leads (not shown but similar to FIGS. 1 and 2) take the electrical signal to the exterior. It has been found that three p-e crystals 20a, 20b, 20c mounted as shown with their outputs connected in parallel is preferred as this is effective in cancelling effects due to bending of the tube.

FIG. 5 shows a method of mounting the split transducer device, either the strain gauge or p-e crystal type, in the field using a clamping means 21, e.g. bolts through the split halves. This allows quick and ready installation and removal for field and test purposes. Other types of connectors might be used. In this figure, the transducers 20 are shown mounted in recesses in the housing with a backing layer 22 which is of vinyl, paper, or other suitable yieldable material.

I claim:

1. A fuel injection monitoring transducer for mounting on the fuel injection lines of engines comprising:
   a. a barrel-shaped housing made of a strong metal material encompassing the fuel line tube and fixedly attached to the tube circumferentially at outer positions and defining an enclosed annular volume between tube and housing,
   b. a pressure measuring element positioned in the said volume away from the fuel tube and adjacent the inner wall of the housing,
   c. a solid cold flowing material completely filling the said volume, and
   d. electrical leads from the element to the exterior of the housing.

2. A fuel injection monitoring transducer as in claim 1 wherein the solid cold flowing material is epoxy resin.

3. A fuel injection monitoring transducer as in claim 1 wherein the pressure measuring element is a strain gauge element with an associated backing layer of compressible material positioned between the strain gauge element and the inner wall.

4. A fuel injection monitoring transducer as in claim 1 wherein the pressure measuring element is a piezo-electric crystal.

5. A fuel injection monitoring transducer as in claim 3 wherein the backing layer is rubber.

6. A fuel injection monitoring transducer as in claim 4 wherein the pressure measuring element comprises three piezo-electric crystals mounted in the transducer annular volume and spaced apart approximately 120° angles from each other 7. A fuel injection monitoring transducer as in claim 1 wherein the housing is in the form of split sections that are positioned around the fuel line and then fixed together with a strong adhesive material.

8. A fuel injection monitoring transducer as in claim 1 wherein the housing is in the form of split sections that are positioned around the fuel line and then fixed together with a mechanical clamping means.

* * * * *